United States Patent [19]
Buratynsky

[11] Patent Number: 5,286,150
[45] Date of Patent: Feb. 15, 1994

[54] TIE DOWN DEVICE

[75] Inventor: Michael P. Buratynsky, Toronto, Canada

[73] Assignee: Spar Aerospace Limited, Brampton, Canada

[21] Appl. No.: 899,302

[22] Filed: Jun. 16, 1992

[51] Int. Cl.⁵ .............................. B60P 1/64; B60P 7/06
[52] U.S. Cl. ................................ 410/103; 24/69 WT; 244/173; 410/100
[58] Field of Search .................. 410/32, 100, 103; 244/173; 24/68 CD, 265 CD, 69 CT, 69 WT

[56] References Cited

U.S. PATENT DOCUMENTS

| | | | |
|---|---|---|---|
| 2,992,750 | 7/1961 | Brock | 410/100 |
| 4,036,476 | 7/1977 | Douce et al. | 410/103 X |
| 4,063,712 | 12/1977 | Arbogast | 410/103 X |
| 4,340,329 | 7/1982 | Ericsson | 410/103 X |
| 4,419,033 | 12/1983 | Roth et al. | 244/173 X |
| 4,491,446 | 1/1985 | Ewald | 410/103 |
| 4,641,798 | 2/1987 | De Haar et al. | 410/32 X |
| 5,145,299 | 9/1992 | Stephenson, Jr. | 410/100 |

FOREIGN PATENT DOCUMENTS 0457683  11/1991  European Pat. Off. ............ 244/173
3615263  11/1987  Fed. Rep. of Germany ...... 244/173

Primary Examiner—Michael S. Huppert
Assistant Examiner—James T. Eller, Jr.

[57] ABSTRACT

To hold a solar panel array of a satellite in a folded position, cable runs from a support on the outside panel through the four corners of the array to a tie down device. Each tie down device has a rotatable shaft with a hook for holding a loop at the end of a cable offset slightly from the center of rotation of the shaft. A lever arm depending from the shaft extends a significant distance from the center of rotation so that the force required to hold the shaft in the tie down position with a cable hooked on the hook is relatively small. Furthermore, because of this relatively small force, the lever arm may be readily released whereupon the small torque applied by the cable to the shaft rotates the shaft thereby releasing the cable. In this way, the satellite solar panel array is released for deployment.

13 Claims, 4 Drawing Sheets

TIE DOWN DEVICE

BACKGROUND OF THE INVENTION

1. Field of the Invention

This invention relates to a tie down device for releasably holding a tensioned connector.

2. Description of the Related Art

In orbit, a satellite utilizes a large area solar array to provide its electrical power. The solar panel array comprises a number of panels that are hinged end to end with a spring hinge arrangement. For transport of the satellite into its orbit, the panels are folded in accordion fashion and tied down in this position. Once the satellite is released in orbit, the tie downs are released and the springe hinges operate to deploy the solar panel array into its operative position. On the Olympus satellite, the tie down mechanism comprised a complex series of levers for providing a mechanical advantage. Another known technique is the use of thermal knives which melt the tensioned connector.

This invention seeks to overcome drawbacks of known tie down devices.

SUMMARY OF THE INVENTION

According to the present invention, there is provided a releasable tie down device, comprising the following: a cap supporting biasing means; a connector depending from said biasing means, said connector terminating in a hookable end; a base; a member rotatably supported by said base about a centre of rotation, said member rotatable between a tie down position and a release position; a lever arm depending from said member and having a latchable section offset from said centre of rotation; means for releasably latching said latchable section of said lever arm; a hook depending from said member and configured so that when said member is in said tie down position, said hook is oriented in an operative hooking position for holding said hookable end of said connector and when said member is in said release position, said hook is oriented in an inoperative position for releasing said hookable end of said connector so that said hookable end of said connector is freed from said hook, said hook positioned so that a force on said latching means when latching said latchable section of said lever arm resulting from any tension in said connector when said hookable end of said connector is held by said hook while said member is in said tie down position is at least an order of magnitude less than said any tension in said connector.

In accordance with another aspect of the invention, there is provided a tie down device for releasably holding a tensioned connector, comprising the following: a base; a shaft supported for rotation by said base about a centre of rotation, said shaft rotatable between a tie down position and a release position; a lever arm depending from said shaft and having a latchable section offset from said centre of rotation; means for releasably latching said latchable section of said lever arm; a cut out in said shaft to about said centre of rotation; a hook with a leg radially extending from said shaft cut out and terminating in means to hold a hookable end of a tensioned connector against said cut out so that a tensioned connector held by said hook has a small offset from said centre of rotation, said offset of a connector held by said hook being sufficiently small compared with the offset of said latchable section of said lever arm that a force on said latching means when latching said latchable section caused by a tensioned connector held by said hook while said shaft is in said tie down position is at least two orders of magnitude less than the tension in said tensioned connector.

In accordance with a further aspect of this invention, there is provided a tie down device for releasably holding a tensioned connector, comprising the following: a base; a member rotatably supported by said base about a centre of rotation, said member rotatable between a tie down position and a release position; a lever arm depending from said member and having a latchable section remote from said centre of rotation; means for releasably latching said latchable section of said lever arm; a hook carried by said member and configured so that when said member is in said tie down position, said hook is oriented in an operative hooking position for holding a hookable end of a tensioned connector and when said member is in said release position, said hook is oriented in an inoperative position for releasing a hookable end of a tensioned connector previously held by said hook, said hook positioned so that the force on said latching means when latching said latchable section of said lever arm caused by a tensioned connector held by said hook while said member is in said tie down position is at least an order of magnitude less than the tension force in said tensioned connector; a shield depending from said base and positioned adjacent said member so as to prevent a hookable end of a tensioned connector held by said hook from disengaging from said hook when said member is in said tie down position and so as to not prevent a hookable end of a tensioned connector when said hook is oriented in said inoperative position.

BRIEF DESCRIPTION OF THE DRAWINGS

In the figures which disclose example embodiments of the invention.

DESCRIPTION OF THE PREFERRED EMBODIMENTS

Figure 1:
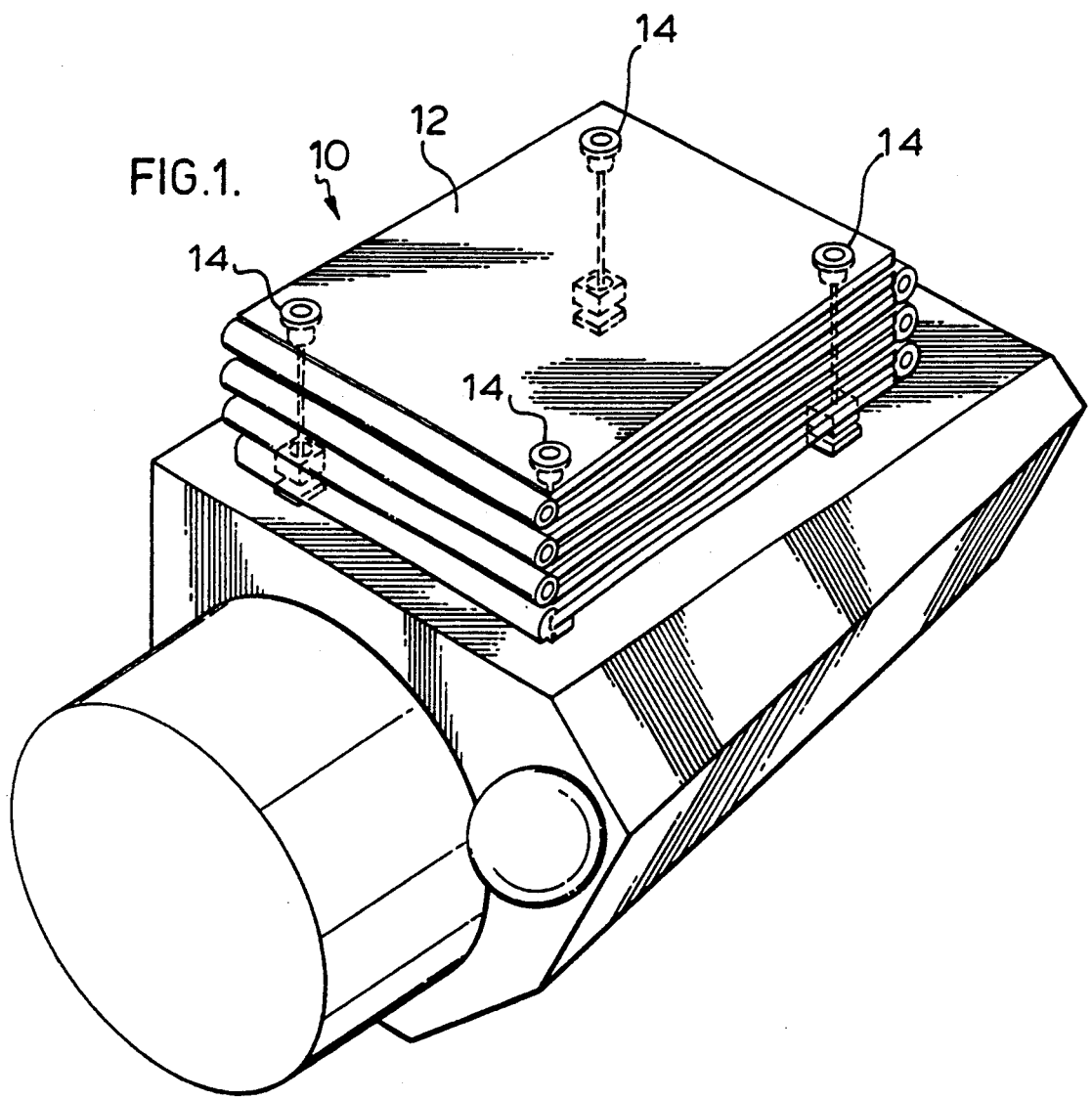
FIG. 1 is a perspective view of a satellite employing the tie down device of this invention.
Figure 2:
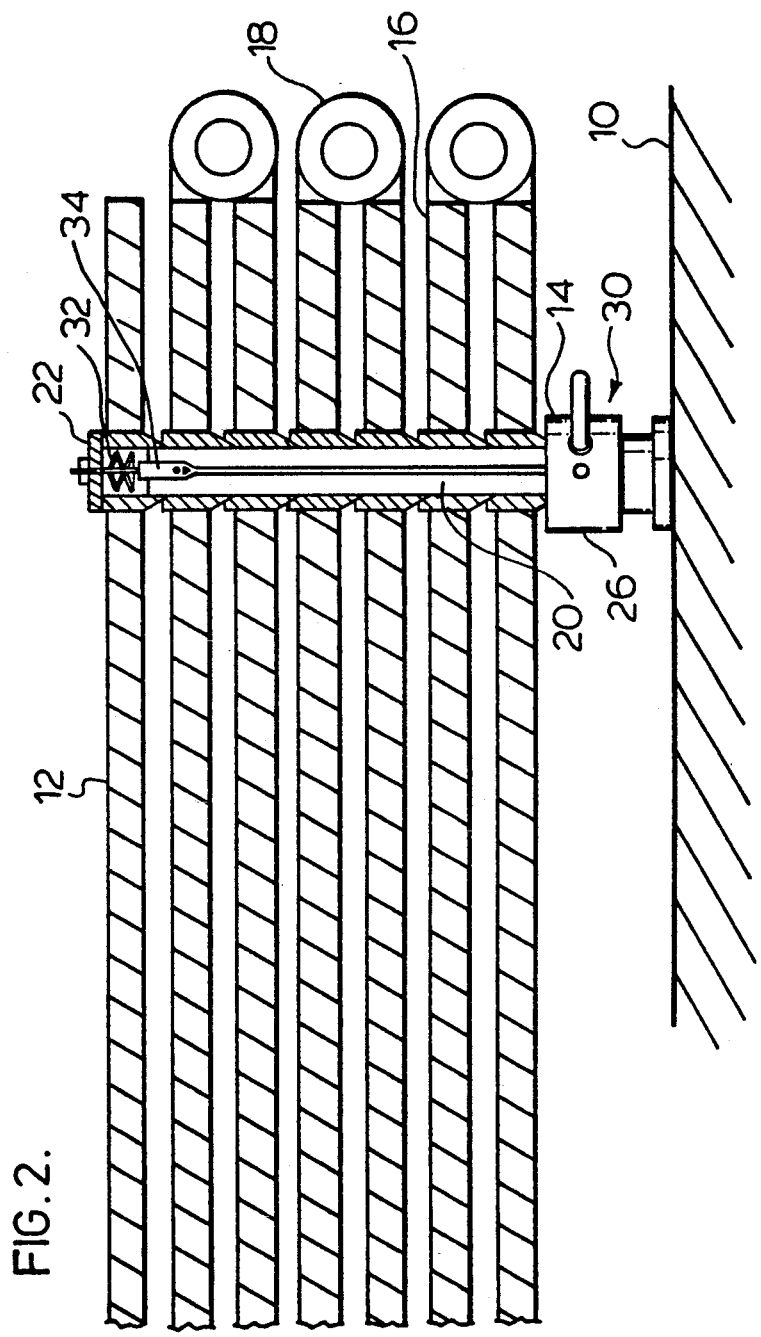
FIG. 2 is a cross-sectional side view of a portion of FIG. 1.

With reference to FIG. 1, a satellite 10 has a folded solar panel array 12 supported thereon. Tie down assemblies 14 are positioned at the four corners of the folded solar panel array to hold the array in this stowed position. With reference to FIG. 2, it is noted that the solar panel array 12 comprises a series of solar panels 16 joined end to end by spring hinges 18. Openings in each panel are aligned to form channels 20 through the panels. Each tie down assembly 14 comprises a cap 22 which is held captive in the outermost panel, a connector 38 which may be a cable, such as a Kevlar TM cable, or a tierod which extends through one of the channels 20, and a tie down device 30 bolted t the satellite 10 and abutting the innermost panel 16.

The cap 22 contains spring washers 32 which spring bias a plunger 34. The plunger extends through the base of cap 22 and one end of the cable 38 is attached to the free end of the plunger. The tie down device 30 releasably holds the other end of the cable under a pre-tensioned load. By way of example only, the opening force of spring hinges 18 together with the resilient force from spring washers 32 may provide about a 2000 lb. load on connector 38.

Figure 3:
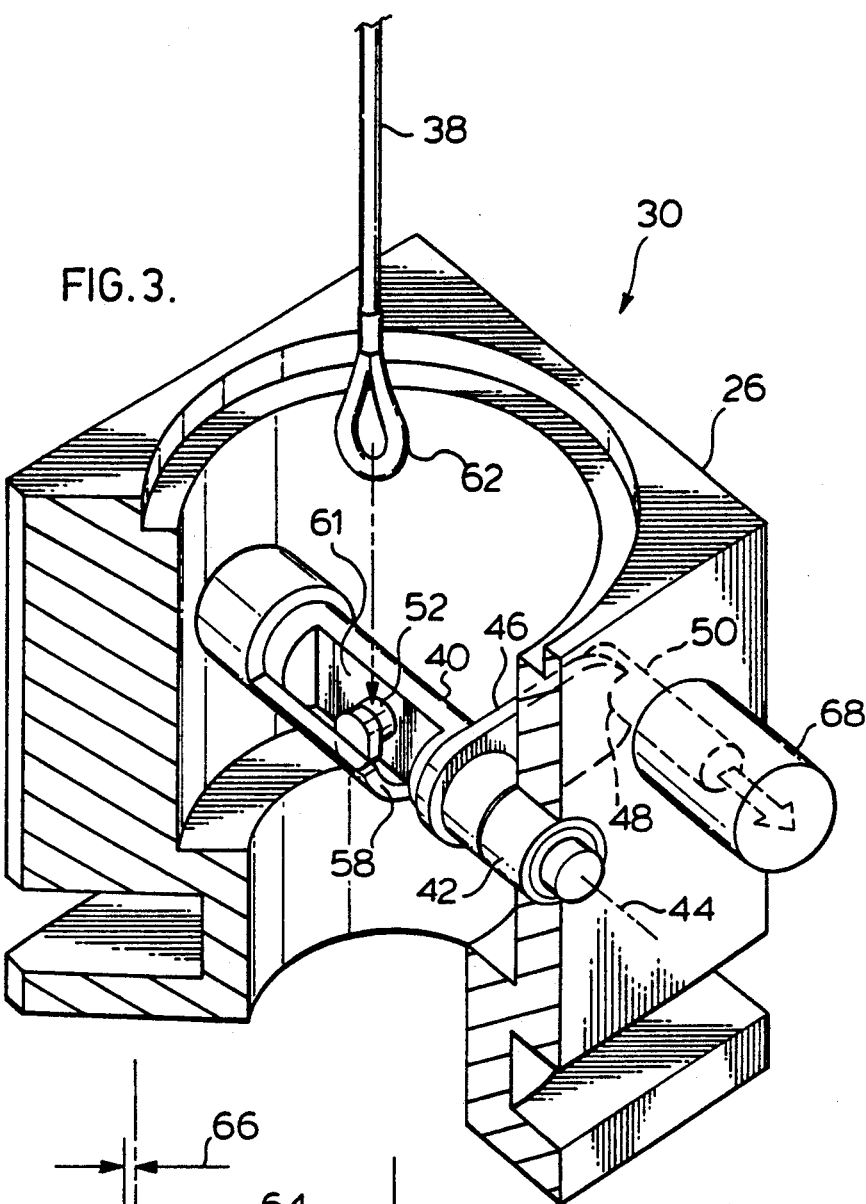
FIG. 3 is a partially sectioned perspective view of a tie down device made in accordance with this invention.
Figures 3A, 3B:
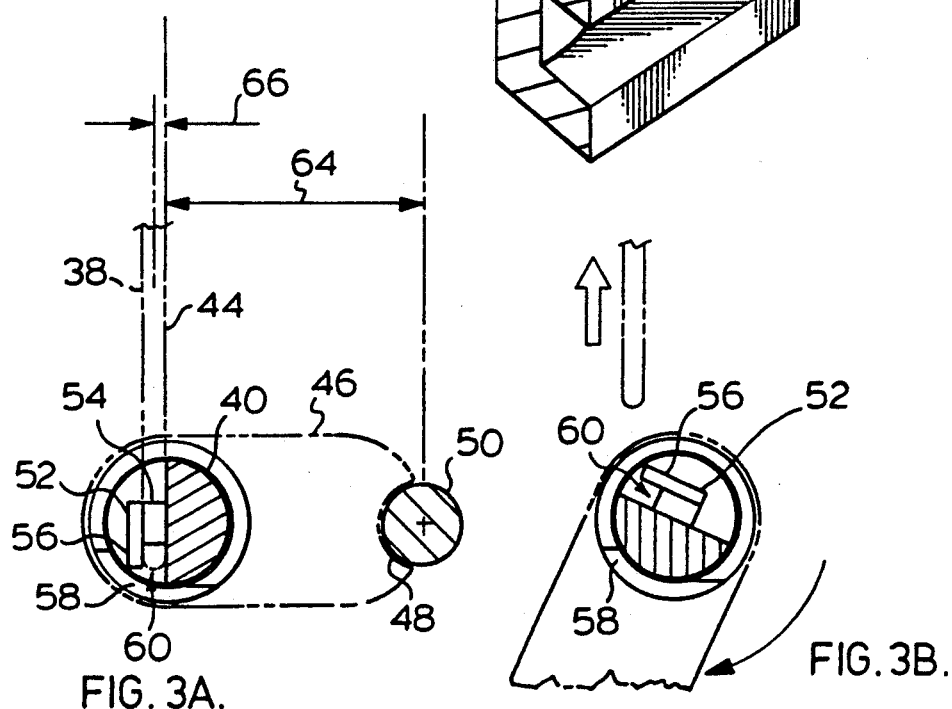
FIG. 3a is a simplified side sectional view of a portion of the tie down device of FIG. 3 shown in a tie down position.
FIG. 3b is a simplified cross-sectional view of a portion of the tie down device of FIG. 3 showing the tie down device in a release position.

Tie down device 30 is detailed in FIG. 3. Turning to FIG. 3, the tie down device comprises a shaft 40 mounted by bearings 42 of housing 26 for rotation about a centre of rotation 44. A lever arm 46 depends from shaft 40 and has a slot 48 in its distal end. When the shaft 40 is in its tie down position, which is illustrated in FIG. 3, slot 48 is aligned with pin 50 which is slidably mounted in base 26 so as to be able to slide into and out of the slot 48. A pin puller 68 is provided to pull pin out of slot 48. A hook 52 is carried by shaft 40. As best seen in FIG. 3a, hook 52 has an L-shaped configuration with one leg 54 projecting radially from a cut out 61 in shaft 40 and a second leg 56 projecting tangentially to shaft 40. A hood 58 extends from base 26 and covers the access end 60 of hook 52 when the shaft 40 is in the tie down position illustrated in FIGS. 3 and 3a. Thus, when the loop 62 of a connector 38 surrounds leg 54 of hook 52 and shaft 40 is in the tie down position illustrated in FIGS. 3 and 3a, the loop 62 cannot be removed from the hook and is held against the cut out. This is best seen by reference to FIG. 3a.

With further reference to FIG. 3a, it is seen that leg 54 of hook 52 extends radially from the centre of rotation 44 of shaft 40. Consequently, a connector 38 held by the hook is held at a small offset 66 from the centre of rotation 44. Furthermore, offset 66 is small as compared with the offset 64 of the slot 48 of lever arm 46 from the centre of rotation 44.

In operation, solar panel array 12 is folded into its stowed position illustrated in FIGS. 1 and 2 and, for the tie down assembly 14 at each corner of the folded array, the loop 62 of connector 38 is pulled over the hook 52 of the tie down device 30 and the shaft 40 is rotated to the tie down position illustrated in FIG. 3a. The pin 50 of each tie down device is then slid into slot 48 of each lever arm 46 in order to hold each shaft 40 in the tie down position. As aforenoted, each connector may be tensioned with about a 2000 lb. load. However, in respect of each tie down device, because of the small offset of connector 38 from the centre of rotation 44 of the shaft 40 as compared with the offset from the centre of rotation of slot 48, a force of much smaller magnitude is applied by the connector at the slot 48 of the lever arm. More particularly, the tie down device may be dimensioned so that a force of at least one order of magnitude less, and preferably two orders of magnitude less, or about 12 lb. force, is applied at the slot 48. The reaction force of pin 50 may therefore resist this small force and hold the shaft 40 in the tie down position.

Because of the small force needed to hold the shaft 40 in the tie down position, only a small force is necessary to remove pin 50 from slot 48. However, once pin 50 is removed, the small moment arm between connector 38 and the centre of rotation 40 provides a torque which rotates shaft 40 to the release position illustrated in FIG. 3b. In the release position, hood 58 no longer covers the access end 60 of hook 52 and the tangential leg 56 of hook 52 no longer impedes the release of loop 62 of connector 38 from hook 52. Accordingly, the connector 38 slides off the hook. With each connector 38 of the four tie down assemblies 14 released, the solar panel array 12 is free to deploy under the influence of spring hinges 18. Pin 50 is removed from slot 48 by pin puller 68 which may be remotely operated once the satellite is in orbit.

Figure 4:
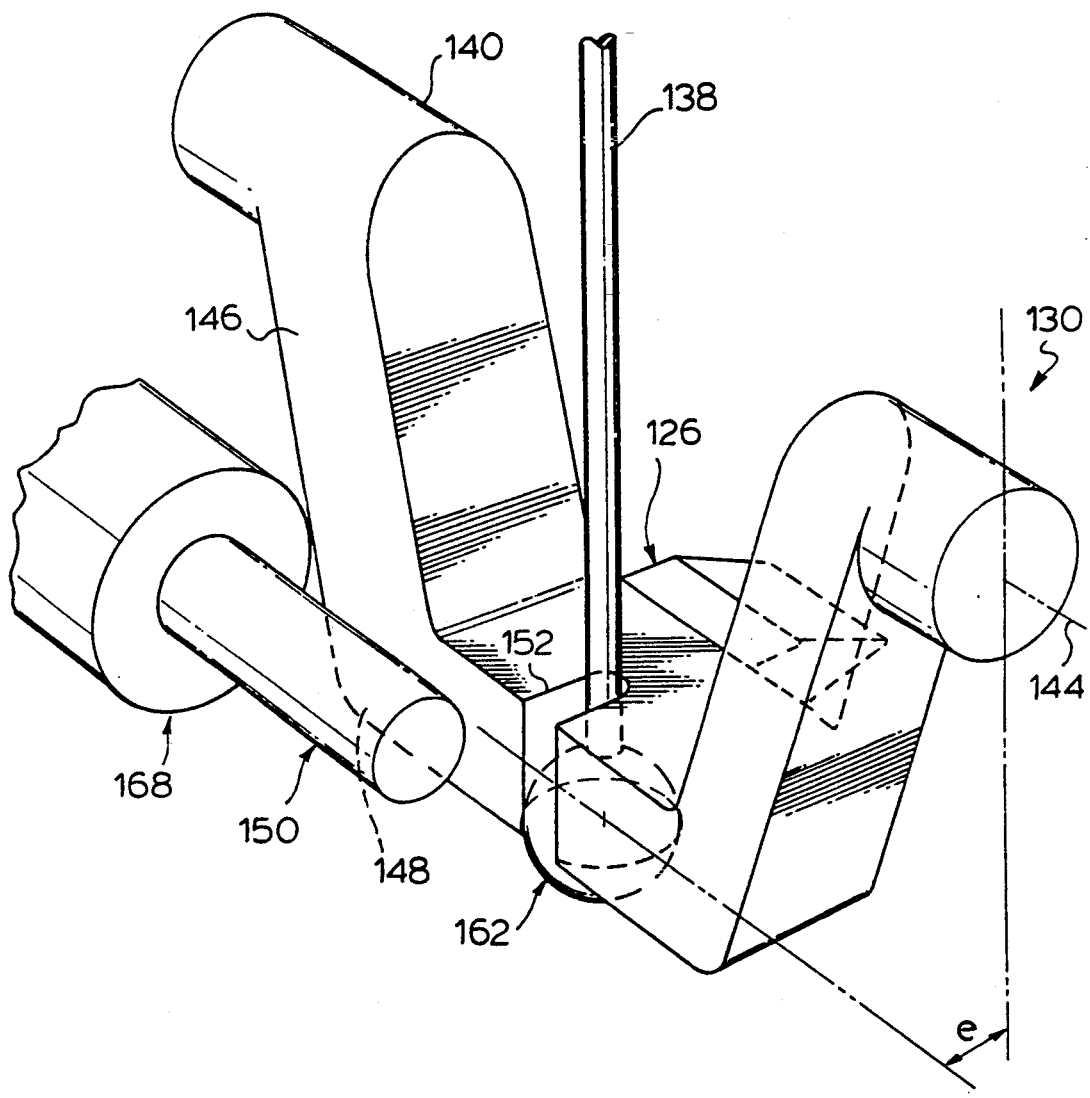
FIG. 4 is perspective view of a portion of a tie down device made in accordance with another embodiment of this invention.

FIG. 4 illustrates an alternate embodiment for the tie down device. Turning to FIG. 4, a tie down device 130 comprises a member 140 which is rotatably supported by the base 126 of the device for rotation about a centre of rotation 144. Member 140 comprises a lever arm 146 having a latchable section 148 remote from the centre of rotation 144. A pin 150 may be interposed in the clockwise rotational path of lever arm 146. The pin is slidably supported by base 126 and pin puller 168 acts to retract the pin. FIG. 4 illustrates the tie down position for member 140. In such position, lever 146 is held against the base 126 of tie down device 130 by pin 150. Member 140 also carries a hook 152. The hook is in the nature of a slot for receiving the ball end 163 of connector 138. The connector 138 applies its pre-tensioned force along its length. In the tie down position illustrated in FIG. 4, member 140 is rotated slightly clockwise of a position whereat the force applied by the connector would pass through the centre of rotation 144. Expressed another way, there is a small angle between the force vector applied by the connector and the radial vector running between the centre of rotation and the ball 162 at the end of the connector 138 within hook 152. Due to this small angle, the torque applied to the member by the connector is small and may easily be resisted by pin 150 which is positioned remotely from the centre of rotation 144. Furthermore, because of the small resisting force which is applied to pin 150, it requires only a small force to remove the pin from the path of lever arm 146 whereupon the small torque applied by the connector 138 acts to rotate member 140 in a clockwise direction to a release position whereat connector 138 is released from hook 152.

Other modifications will be apparent to those skilled in the art and, accordingly, the invention is defined in the claims.

What is claimed is:

1. A releasable tie down device, comprising the following:
    a cap; biasing means supported by said cap;
    a connector depending from said biasing means, said connector terminating in a hookable end;
    a base;
    a member rotatably supported by said base about a center of rotation, said member rotatable between a tie down position and a release position;
    a lever arm depending from said member and having a latchable section offset from said center of rotation;
    means for releasably latching said latchable section of said lever arm to prevent rotation of said member;
    a hook depending from said member and configured so that when said member is in said tie down position, said hook is oriented in an operative hooking position for holding said hookable end of said connector and when said member is in said release position, said hook is oriented in an inoperative position for releasing said hookable end of said connector so that said hookable end of said connector is freed from said hook, said hook positioned on said member so that a force on said latching means when latching said latchable section of said lever arm resulting from any tension in said connector applied by said biasing means when said hookable end of said connector is held by said hook while said member is in said tie down position is at least an order of magnitude less than said any tension in said connector.

2. The tie down device of claim 1 wherein said hook is positioned on said member such that said connector, when held by said hook, is offset from said centre of rotation, said offset of said connector being sufficiently small as compared with the offset of said latchable section of said lever arm from said centre of rotation so that a force on said latching means when latching said latchable section of said lever arm caused by any tension in said connector while said member is in said tie down position is at least an order of magnitude less than the tension in said connector.

3. The tie down device of claim 2 wherein said hook comprises an L-shaped finger having a first leg radially extending from said member for holding said connector and a second leg oriented such that in said tie down position said second leg prevents said connector held by said first leg from sliding off said first leg.

4. The tie down device of claim 2 wherein said hook has an access end for reception of said hookable end and includes a hood depending from said base positioned so as to block said access end when said hook is in said operative position in order to prevent said hookable end from disengaging from said hook and so as not to block said access end when said hook is in said inoperative position in order to permit said hookable end to disengage from said hook.

5. The tie down device of claim 1 wherein said hook has an access end for reception of said hookable end and includes a hood depending from said base positioned so as to block said access end when said hook is in said operative position in order to prevent said hookable end from disengaging from said hook and so as not to block said access end when said hook is in said inoperative position in order to permit said hookable end to disengage from said hook.

6. The tie down device of claim 5 wherein said latchable section of said lever arm comprises a slot and wherein said latching means comprises a pin slidably carried by said base for sliding into said slot to latch said lever arm and for sliding out of said slot for releasing said lever arm.

7. The tie down device of claim 1 wherein a angle between a line from said centre of rotation to the hookable end of said connector when held by said hook and a line directed along the connector while said member is in said tie down position is sufficiently small so that a force on said latching means when latching said latchable section of said lever arm resulting from any tension in said connector is at least an order to magnitude less than said any tension in said connector.

8. The tie down device of claim 1 wherein said member has a cut-out recessed to a depth approximately at said centre of rotation and said hook extends from said cut-out and further including means to hold said hookable end of said connector against said cut-out.

9. A tie down device for releasably holding a tensioned connector, comprising the following:
a base;
a shaft supported for rotation by said base about a centre of rotation, said shaft rotatable between a tie down position and a release position;
a lever arm depending from said shaft and having a latchable section offset from said centre of rotation;
means for releasably latching said latchable section of said lever arm to prevent rotation of said shaft;
a cut-out in said shaft recessed to a depth approximately at said centre of rotation;
a hook with a leg radially extending from said shaft cut-out and terminating in means to hold a hookable end of a tensioned connector against said cut-out so that a tensioned connector held by said hook has a small offset from said centre of rotation, said offset of said connector held by said hook being sufficiently small compared with the offset of said latchable section of said lever arm such that a force on said latching means when latching said latchable section caused by a tensioned connector held by said hook while said shaft is in said tie down position is at least two orders of magnitude less than the tension in said tensioned connector.

10. The tie down device of claim 9 wherein said means to hold a hookable end of a connector against said cut-out comprises a further leg, said further leg oriented to prevent a tensioned connector held by said leg from sliding off said leg when said shaft is in said tie down position and to allow a tensioned connector held by said hook to slide off said hook when said shaft is in said release position.

11. The tie down device of claim 9 wherein said latchable section of said lever arm is a slot and wherein said releasable latching means is a pin slidably supported by said base for reciprocating between a first position wherein said pin engages said slot to latch said lever arm and a second position wherein said pin disengages said slot to release said lever arm.

12. A tie down device for releasably holding a tensioned connector, comprising the following:
a base;
a member rotatably supported by said base about a centre of rotation, said member rotatable between a tie down position and a release position;
a lever arm depending from said member and having a latchable section offset from said centre of rotation;
means for releasably latching said latchable section of said lever arm to prevent rotation of said member;
a hook depending from said member and configured so that when said member is in said tie down position, said hook is oriented in an operative hooking position for holding a hookable end of a tensioned connector and when said member is in said release position, said hook is oriented in an inoperative position for releasing a hookable end of a tensioned connector previously held by said hook, said hook positioned on said member such that a force on said latching means when latching said latchable section of said lever arm resulting from any tension in said connector when said hookable end of said connector is held by said hook while said member is in said tie down position is at least an order of magnitude less than the tension force in said tensioned connector;
a shield depending from said base and positioned adjacent said member so as to prevent a hookable end of a tensioned connector held by said hook from disengaging from said hook when said member is in said tie down position and so as to not prevent a hookable end of a tensioned connector held by said hook from disengaging from said hook when said member is oriented in said inoperative position.

13. The tie down device of claim 12 wherein said hook has an access end and wherein said shield blocks said access end when said hook is in said operative position.

* * * * *

UNITED STATES PATENT AND TRADEMARK OFFICE
CERTIFICATE OF CORRECTION

PATENT NO. : 5,286,150
DATED : February 15, 1994
INVENTOR(S) : Michael P. Buratynsky It is certified that error appears in the above-indentified patent and that said Letters Patent is hereby corrected as shown below:

column 5, line 52, delete "a" and insert --an--.

column 5, line 59, delete "to" and insert --of--.

Signed and Sealed this

Twelfth Day of July, 1994

Attest:

BRUCE LEHMAN

Attesting Officer

Commissioner of Patents and Trademarks